Aug. 18, 1942.   L. J. B. LA COSTE ET AL   2,293,437
FORCE MEASURING DEVICE
Filed March 19, 1941   4 Sheets-Sheet 1

LUCIEN J.B. LA COSTE
ARNOLD ROMBERG
INVENTORS.

BY Lester B. Clark

ATTORNEY.

Aug. 18, 1942.   L. J. B. LA COSTE ET AL   2,293,437
FORCE MEASURING DEVICE
Filed March 19, 1941    4 Sheets-Sheet 2

LUCIEN J.B. LA COSTE
ARNOLD ROMBERG
INVENTORS.

BY Lester B. Clark

ATTORNEY.

LUCIEN J.B. LA COSTE
ARNOLD ROMBERG
INVENTORS.

BY Lester B. Clark

ATTORNEY.

Aug. 18, 1942.  L. J. B. LA COSTE ET AL  2,293,437
FORCE MEASURING DEVICE
Filed March 19, 1941  4 Sheets-Sheet 4

LUCIEN J.B. LA COSTE
ARNOLD ROMBERG
INVENTORS.

BY Lester B. Clark

ATTORNEY

Patented Aug. 18, 1942

2,293,437

UNITED STATES PATENT OFFICE 2,293,437

FORCE MEASURING DEVICE

Lucien J. B. La Coste and Arnold Romberg, Austin, Tex.

Application March 19, 1941, Serial No. 384,164

26 Claims. (Cl. 265—1.4)

This invention relates to a force measuring device which is particularly adapted to the measurement of very small variations in a force. A very important application of the invention is its use as a gravity meter in the location of valuable deposits in the earth, such as oil.

This invention relates to and broadly comprehends the subject matter of our copending application Serial No. 262,114, filed March 16, 1939, and is entitled to the filing date thereof for all common subject matter.

One important object of the invention is to attain an extremely large ratio of deflection to force-variation which results in the attainment of an enormous sensitivity. The high sensitivity of the instrument makes measurements of very small deflections unnecessary and thereby eliminates any unreliability attending them.

Another object is to provide an instrument which is not subject to being disturbed by microseisms or vibrations due to traffic, wind, etc.

Still another object of the invention is to provide an instrument of high sensitivity without any tendency toward instability, a feature which is important for reliability of operation.

Another important object of the invention is the attainment of a constant and high sensitivity over a large range of movement of the moving system.

The foregoing objects are primary objects and will, together with other objects, be more apparent by reference to the following description taken in connection with the accompanying drawings in which.

Figure 20:
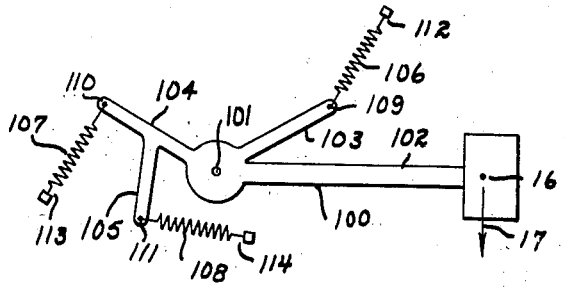
Figure 21:
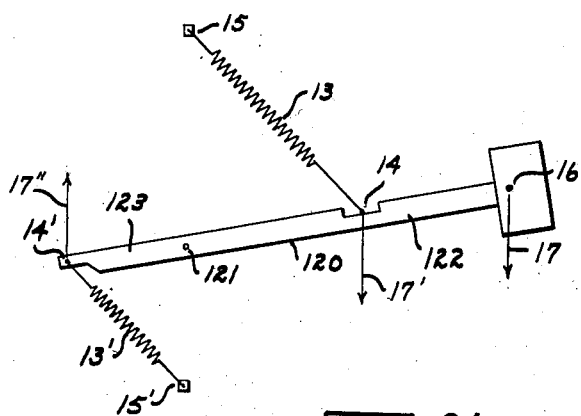
Figure 22:

Figs. 11 to 19 inclusive are diagrammatic illustrations of alternative structures embodying the invention;

Figs. 20 to 21 inclusive illustrate embodiments in which a plurality of zero-length springs are utilized;

Fig. 22 illustrates a manner of utilizing a plurality of springs to be effective as a zero-length spring.

In the invention the force to be measured is balanced in whole or in part by a spring or a plurality of springs and certain precautions are taken to reduce the errors due to elastic hysteresis, or elastic imperfections, in the spring or springs and in other connections between members having relative motion.

One form of the invention contains resilient connections between all members having relative motion. Such connections make the instrument capable of standing greater shocks and therefore increase the reliability of the device when it is used as a portable instrument.

The invention also recognizes the advantages obtainable by providing a force responsive moving system having a long period of vibration. This feature may be illustrated by considering, for simplicity, that the mass of the moving system is concentrated at one point. Then if, F is a small change in the force acting upon the moving system in dynes, $x$ is the corresponding movement of the moving system in cm. under this change in force, $m$ is the mass of the moving system in grams, and P is the period of vibration in seconds of the moving system when vibrating in the given field of force, then $$x = \left(\frac{P}{2\pi}\right)^2 \frac{F}{m}$$

It is thus seen that the deflection for a given change in force varies as the square of the period. Prior to the present invention, periods of 4.4 seconds were substantially the best obtainable. In accordance with the invention, however, periods as great as 44 seconds may readily be attained without loss in reliability of operation.

The preceding equation shows that for a change in force of 1 part in 10,000,000 the deflection is only 0.000,05 cm. for a 4.4 second period but is 0.005 cm. for a 44 second period. The longer period thus eliminates the need for accurate measurement of the deflection and thereby simplifies the instrument and makes it more reliable.

Other advantages accrue from this long period and resultant larger deflection. For instance consider the effect of a motion of .005 cm. in the frame to which the deflection measuring device is attached. Such motion might be caused by temperature effects or jars. If the period of the instrument is only 4.4 sec. the error caused by the motion is 1 part in 100,000, but if the period is 44 seconds the error is 1 part in 10,000,000.

Another advantage of a long period instrument is that it is less subject to reading-errors caused by vibrations due to traffic, wind, etc. For instance if traffic is causing vibrations of the moving system of .005 cm., then an error of the order of magnitude of 1 part in 100,000 might be expected when the instrument has a period of 4.4 seconds, but an error of the order of magnitude of only 1 part in 10,000,000 might be expected when the instrument has a period of 44 seconds.

These advantages of a long period instrument have been known for some time, but no method of overcoming the difficulties was known. It was known that a spring-suspended system could be suspended to oscillate about a position of stable equilibrium and that the period of oscillation about this position could be made long. But it was always found that there was a position of unstable equilibrium not far from the position of stable equilibrium and that these two positions approached each other more closely the longer the period was made. The long periods were thus found to hold only for infinitely small deflections from the position of stable equilibrium, and furthermore the restoring force, instead of being proportional to the deflection, as in simple harmonic motion, varied in a complicated way. For these reasons long periods were in all cases found to involve great unreliability. This invention eliminates completely the position of unstable equilibrium and the unreliability of instruments possessing long periods of oscillation.

Inasmuch as the spring and its characteristic plays an important part in the invention it is desirable to consider some properties of springs in general. For example if F represents the force exerted by a spring, $l$ represents the length of the spring, and $k$ represents the spring constant, then according to Hookes law:

$$F = k(l - l_0) \qquad (1)$$

when $l_0$ is a quantity characteristic of the given spring and is usually called the initial length or unstretched length of the spring. For most springs $l_0$ can be determined by measuring the length of the spring when the spring is not supporting a weight, but this can not always be done. In some springs the successive turns press against each other with considerable force even when the spring is not supporting a weight. The stress in such a spring can not be removed by allowing it to collapse, and therefore its length in a collapsed state will not give the correct value of $l_0$ to be used in Equation 1. However $l_0$ can be determined by measuring the length of the spring for two different loads which separate the turns of the spring and by using Equation 1. For example, consider a spring with the following characteristics. With no load on the spring the turns press against each other. In this condition the length of the spring is 3 inches. When a load of 2 lbs. is applied to the spring, its length becomes 4 inches, and when a load of 3 lbs. is applied to the spring its length becomes 5 inches. These characteristics can be obtained experimentally. Now substituting these data into Equation 1; $2 = k(4 - l_0)$ and $3 = k(5 - l_0)$. From which $l_0 = 2$ inches. Solving for $l_0$ we obtain $l_0 = 2$ inches.

This value of $l_0$ shows that if the spring could be unstressed, it would have a length of 2 inches. Actually however, as previously mentioned, this spring can never have a length less than 3 inches because its turns come into contact when it has that length. In this invention the quantity $l_0$ will be called the unstressed length of a spring because either it is the length of the spring when it is unstressed or would be the length of the spring if it could be unstressed.

As illustrated by an article in "Gerland's Beitrage Zur Geophysik" by J. Wilip, vol. 19, p. 387 (1928), heretofore it was erroneously assumed by workers skilled in the art that unstressed lengths of springs must be essentially positive. This erroneous assumption delayed important improvements in instruments of this type, the present invention constituting a departure from established practice. It is desirable to illustrate such departure by referring to experimental proof of zero and negative length springs. Methods of producing such springs will be described hereinafter.

If a given spring has a length of 5 inches when supporting a load of 5 pounds and a length of 6 inches when supporting a load of 6 pounds and these data are substituted in Equation 1 we find that $l_0 = 0$. Such a spring will be called a zero unstressed length spring or a zero-length spring. Zero-length springs possess special characteristics, which are of importance in the present invention as will more fully appear.

As a further example consider a spring which has a length of 3 inches when supporting a load of 5 pounds and a length of 4 inches when supporting a load of 6 pounds. If these data are substituted into Equation 1, it is found that $l_0 = -2$ inches. Such a spring will be called a negative unstressed length spring or a negative length spring.

Negative length springs also have important properties, one of which is that a zero-length spring can be made out of a negative length spring by adding straight wire to it. Consider for instance the preceding example for which $l_0 = -2$ inches. Let us add 2 inches of wire to one end of this spring. Then the length of the combination of the original spring and wire is 5 inches when supporting a load of 5 pounds and 6 inches when supporting a load of 6 pounds. The unstressed length of the combination is therefore zero. Since it is difficult to wind springs having exactly the unstressed length desired, they are ordinarily wound more negative than desired and enough straight wire is added to them to give them the desired unstressed length.

From the foregoing discussion it can be seen that the following definitions apply to zero and negative length springs. A zero length spring can be defined as a spring in which, when loaded so that the successive turns are separated, the force exerted thereon is equal to a constant times the distance between the ends of the spring. Defined in another and perhaps more precise way a zero length spring is a spring whose two ends either coincide when unloaded or would coincide if the turns did not come into contact. Similarly a negative length spring can be defined as a spring whose ends either must move past each other while the spring is being unloaded or would move past each other if the turns of the spring did not come into contact.

Figure 1:
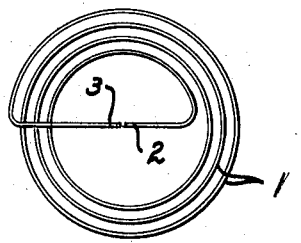
Fig. 1 is a plan view of one type of zero-length spring.
Figure 3:
Fig. 3 is similar to Fig. 2 but showing the spring in unstressed condition.
Figure 2:
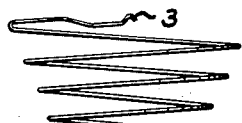
Fig. 2 is a side elevation of the spring shown in Fig. 1, the spring being shown in stressed condition.

Methods of making zero and negative length springs will now be considered. A very simple type of zero-length spring is shown in Figs. 1, 2 and 3 as the spiral or pancake type of spring in which the diameter of the turns $l$ in the spring varies so that the spring can collapse into practically a plane when it is unloaded. In the unloaded condition the two ends 2 and 3 of the spring practically coincide.

Figure 4:
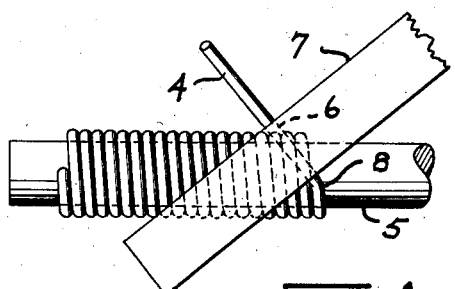
Figs. 4 and 5 are respectively plan and elevational views showing the manner of winding a helical type of zero-length spring upon a rotating mandrel.
Figure 5:
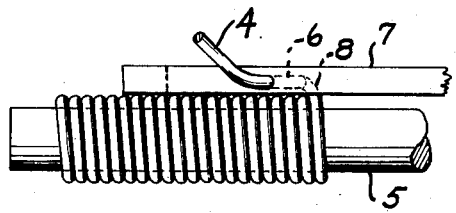

It is possible, and generally preferable, to make a zero-length spring, or a negative length spring, of the ordinary helical type. This can be done by winding the spring in such a way that the turns press against each other sufficiently when the spring is not loaded. A method of forming such a spring is illustrated in Figs. 4 and 5. The spring wire or rod 4 is wound on the mandrel 5. Such wire is passed thru the hole 6 in the flat bar 7 just before being wound on the mandrel. The bar 7 is held flat against the forming spring and at an angle with the direction of the mandrel as shown in Fig. 4. As the wire 4 emerges from the hole 6 it must bend at 8 in order to move into alinement with the other turns of the spring. This causes the turns to press against each other. To obtain a zero or negative unstressed length it is necessary to choose a sufficiently large ratio of the spring diameter to the wire diameter. If this is not done, the stress in the wire will exceed the elastic limit before the turns press against each other with enough force.

Description is now directed to one of the simplest forms of the force measuring device of the invention. This form is shown diagrammatically in elevation in Fig. 6 and comprises an arm 11 which is pivoted on the fixed axis 12 which is perpendicular to the plane of the paper. The zero-length spring 13 has one end attached to the arm 11 at 14 and the other end fixed to a support at 15. The force to be measured is exerted on the arm 11 in the direction of the arrow 17. If this force is gravitational, it is exerted on the arm because of the mass of the arm and can be considered as being concentrated at the center of gravity 16 of the arm. If the force to be measured is other than gravitational, we will assume that the arm 11 is adapted to be acted upon by this force and that the effective point of its application on the arm 11 is at point 16. It will also be assumed that this force to be measured is constant in magnitude and direction over the region in which the arm 11 can move; gravitational forces fulfill this condition very accurately. Forces which do not fulfill this condition will be considered later.

Let us now consider mathematically the force measuring instrument just described. As previously mentioned the beam 11 is pivoted so that it has an axis of rotation or pivot line. This pivot line is designated by the reference character 12 and is a line perpendicular to the plane of the drawing. Ordinarily the pivot line 12 is substantially perpendicular to the direction 17 of the force to be measured but for the general case it will be assumed that there is an angle $A$ between them. Now referring to Fig. 6 it will be assumed that $a$ is the distance from the point 15 to the pivot line 12; $b$ is the distance from the point 14 to the pivot line 12; $c$ is the distance from the point 16 to the pivot line 12; $d$ is the distance from the spring 13 to the pivot line 12; $E$ is the distance from 14 to 15; $e$ is the length of the projection of the distance from 14 to 15 on a plane perpendicular to the pivot line 12. The dihedral angles hereinafter referred to all appear as ordinary angles in Fig. 6 because their planes are perpendicular to the plane of the paper in Fig. 6; $\theta$ is the dihedral angle having its vertex on the pivot line 12, one plane passing thru 14 and the other thru 15; $\phi$ is the dihedral angle having its vertex on the pivot line 12, one plane passing thru 16 and the other plane extending from 12 in the direction opposite to the direction 17 of the force; $\beta$ is the dihedral angle having its vertex line through 15 parallel to the pivot line 12, one plane passing thru 12 and the other plane passing thru 14; $k$ is the spring constant; and $W$ is the magnitude of the force to be measured.

Then the torque produced about the pivot 12 by the force to be measured is $$T_w = -Wc \sin A \sin \phi \qquad (2)$$

The negative sign is used because the torque is clockwise. Since the spring 13 is a zero-length spring, the force it exerts is:

$$F^1 = kE \qquad (3)$$

The component of this force on a plane perpendicular to the pivot line 12 is $$F = ke \qquad (4)$$

The torque produced about 12 by the spring is therefore:

$$T_s = ked \qquad (5)$$

By the sine law:

$$e = \frac{b \sin \theta}{\sin \beta} \qquad (6)$$

and $$d = a \sin \beta \qquad (7)$$

therefore $$T_s = kab \sin \theta \qquad (8)$$

This last equation for $T_s$ gives the torque produced by any zero-length spring.

The total torque on the arm 11 is $$T_o = T_s + T_g \qquad (9)$$
$$= kab \sin \theta - Wc \sin A \sin \phi \qquad (10)$$

By suitably choosing the point 15, $\phi$ can be made equal to $\theta$ for all positions of the arm 11. This gives $$T_o = (kab - Wc \sin A) \sin \theta \qquad (11)$$

The quantities in the parentheses can be chosen so that $$kab - Wc \sin A = 0 \qquad (12)$$

This gives $$T_o = 0 \text{ for all values of } \theta \qquad (13)$$

Equation 13 shows that the arm will stay in any position that it is put or that it has an infinite period of oscillation and therefore an infinite sensitivity. The infinite sensitivity can also be seen by inspecting Equation 11 for the case in which Equation 12 is satisfied. If $W$ is increased, $T_o$ becomes negative and the arm will move in a counterclockwise direction until it is vertical. Also if $W$ is decreased, then $T_o$ becomes positive and the arm will move in a clockwise direction until the arm is vertical. These motions of the arm take place no matter how small the changes in $W$, and therefore the sensitivity is infinite and constant for any position of the arm.

Let us now consider the effect of slightly changing the conditions just considered. We will take the unstressed length of the spring to be some small amount $L$ instead of zero, and we will take the angle $\phi$ to be equal to $\theta + \Delta$ when $\Delta$ is a small angle. For simplicity we will also take $A = 90°$ and will require that the points 14 and 15 lie in a plane perpendicular to the pivot line 12. The total torque is then $$T_o = Wc \sin (\theta + \Delta) - kab \sin \phi + Lka \sin \beta \qquad (14)$$

By the sine law $$\sin \beta = \frac{b \sin \theta}{e} \qquad (15)$$

Substituting this value of sin $\beta$ into Equation 14 gives.

$$T_o = Wc \sin(\theta+\Delta) - kab\left(1-\frac{L}{e}\right)\sin\theta \quad (16)$$

For equilibrium $$T_o = 0 \quad (17)$$

and therefore $$W = \frac{kab\left(1-\frac{L}{e}\right)\sin\theta}{c\sin(\theta+\Delta)} \quad (18)$$

We also have $$e = \sqrt{a^2+b^2-2ab\cos\theta} \quad (19)$$

If the period of vibration is denoted by P; then $$\frac{1}{P^2} = -K^2\frac{dT_0}{d\theta} \quad (20)$$

when K is some constant. Therefore by differentiating Equation 16, substituting in Equation 20, and also making use of Equation 19

$$\frac{1}{P^2} = K^2\left[-Wc\cos(\theta+\Delta) + kab\left(1-\frac{L}{e}\right)\cos\theta + \frac{Lka^2b^2\sin^2\theta}{e^3}\right] \quad (21)$$

Substituting the value of W given in Equation 18 into Equation 21

$$\frac{1}{P^2} = K^2 kab\left[\left(1-\frac{L}{e}\right)\cos\theta - \frac{\left(1-\frac{L}{e}\right)\sin\theta}{\tan(\theta+\Delta)} + \frac{Lab\sin^2\theta}{e^3}\right] \quad (22)$$

Now, let $$\theta = 90° - \delta \quad (23)$$

Then, if the arm 11 is approximately horizontal, $\delta$ is a small angle. Neglecting third order terms in $\delta$ and $\Delta$ $$\sin\theta = 1 - \frac{\delta^2}{2} \quad (24)$$

$$\cos\theta = \delta \quad (25)$$

$$\sin^2\theta = 1 - \delta^2 \quad (26)$$

$$\tan(\theta+\Delta) = \frac{1+\frac{\Delta^2}{2}-\frac{\delta^2}{2}+\Delta\delta}{(\delta-\Delta)} \quad (27)$$

$$e = \sqrt{a^2+b^2} - \frac{ab}{\sqrt{a^2+b^2}}\delta \quad (28)$$

$$e^3 = (a^2+b^2)^{3/2} - 3ab\sqrt{a^2+b^2}\,\delta + \frac{3a^2b^2}{\sqrt{a^2+b^2}}\delta^2 \quad (29)$$

Substituting these approximations into Equation 22 and neglecting third order terms in L, $\delta$, and $\Delta$ gives $$\frac{1}{P^2} = K^2 kab\left[\Delta + \frac{L}{\sqrt{a^2+b^2}}\cdot\left(\frac{ab}{a^2+b^2}-\Delta+\frac{3a^2b^2\delta}{(a^2+b^2)^2}\right)\right] \quad (30)$$

In considering Equation 30 it should be remembered that a negative value of $P^2$ indicates instability. Equation 30 shows that the period, or sensitivity, can be adjusted either by adjusting the angle $\Delta$ or by adjusting the unstressed length of the spring. It shows that a high sensitivity can be attained even with L not equal to zero by suitably adjusting $\Delta$, that is, by tilting the support of the instrument, and it shows that high sensitivity can be attained with $\Delta$ not equal to zero by properly adjusting the unstressed length of the spring. Equation 30 also shows that the sensitivity will be constant if the unstressed length of the spring is made zero and the sensitivity is adjusted by adjusting the angle $\Delta$.

Figure 6:
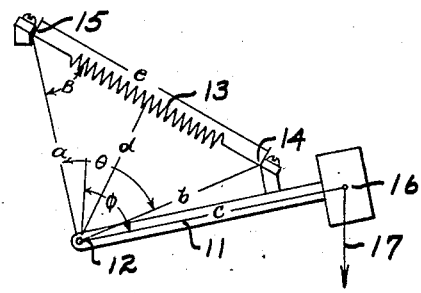
Fig. 6 is a diagrammatic illustration of a device embodying the invention.

Equation 30 is very useful in attaining high and constant sensitivity when the conditions previously set down for the device shown in Fig. 6 are not satisfied but are only approximated, such as, for example, when the force to be measured is not constant over the region in which the arm 11 can move, or the pivot line 12 moves somewhat as the arm 11 moves. Such approximations to the correct conditions may cause two difficulties: first, the sensitivity may differ from that desired, and second, the sensitivity may vary as $\theta$ (or $\delta$) varies.

Equation 30 suggests the following method for eliminating these difficulties. The sensitivity at a given value of $\theta$ should be adjusted to the desired amount by adjusting $\Delta$. The sensitivity at other values of $\theta$ near the chosen value should then be determined. If the sensitivity increases with $\theta$, then according to Equation 30, the unstressed length of the spring should be decreased alegbraically and vice versa. The sensitivity should then be readjusted to the desired value at the chosen value of $\theta$ and this process should be repeated until the maximum constancy of sensitivity is attained.

Consideration is now directed to the forces exerted on the pivot 12 when the spring 13 is a zero-length spring and $\Delta$ is zero. The force exerted on the pivot by the spring is directed from the point 14 to the pivot line 12 and is $$F_s = ke\cos\alpha \quad (31)$$

when $\alpha$ = the dihedral angle having its vertex at 14 and parallel to the pivot line 12, one plane passing thru 12 and the other plane passing thru 15.

But $$e\cos\alpha = b - a\cos\theta \quad (32)$$

therefore $$F_s = kb - ka\cos\theta \quad (33)$$

The force exerted on the pivot 12 by the force to be measured is directed from the point 16 to the pivot line 12 and is $$F_w = W\cos\phi \quad (34)$$

Figure 8:
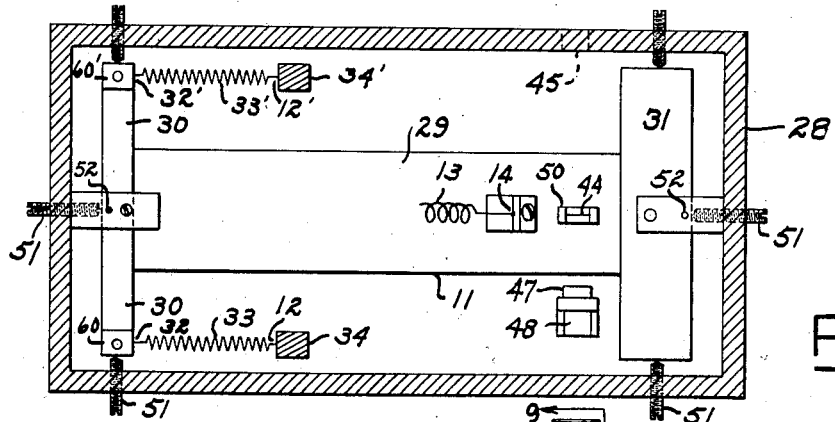
Fig. 8 is a sectional view taken on line 8—8 in Fig. 7.
Figure 7:
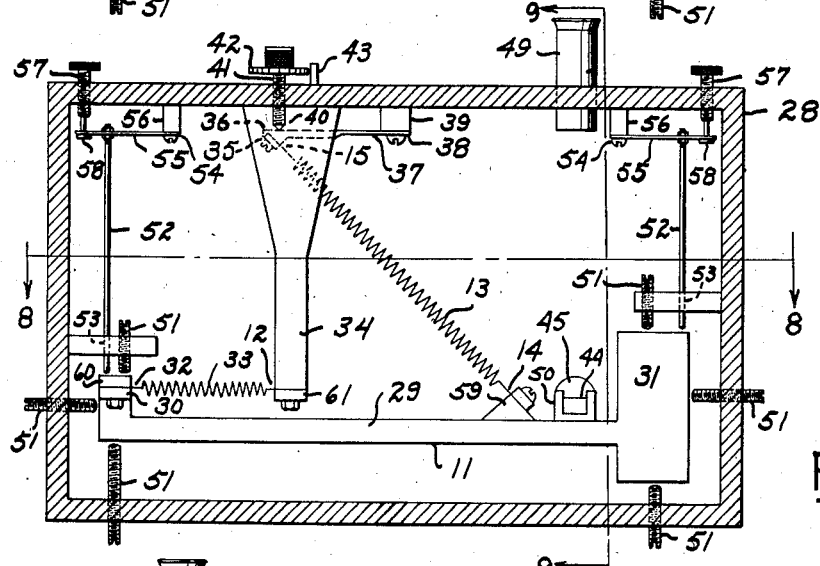
Fig. 7 is an elevational view showing a complete structure comprising the invention, the instrument housing being shown in section.
Figure 9:
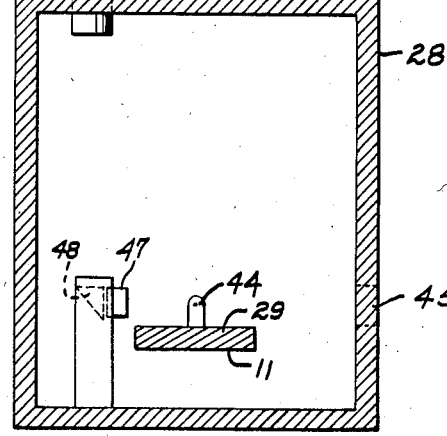
Fig. 9 is a sectional view taken on line 9—9 in Fig. 7.

Reference is now made to Figs. 7, 8 and 9 of the drawings which illustrate an adaptation of the invention for use as a gravity meter. The numeral 28 refers to a fixed support. The movable arm is designated as 11 and consists of an elongated portion 29 having projections 30 on one end and a relatively massive portion 31 on the other end. Gravity exerts a force downwardly on the arm 11, which can be considered as concentrated at the center of gravity 14 of the arm 11, similar to point 16 in Fig. 6.

The arm 11 is supported at the points 14, 32, and 32' by the three springs 13, 33, and 33', each of which has one end clamped at one of said points. The other ends of the springs 33 and 33' are clamped at 12 and 12' respectively to the columns 34 and 34' which are fixed to the support 28. The other end of the spring 13 is clamped at 15 to a clamp 35 which in turn is attached to the support 28 thru a mechanism enabling accurately measurable vertical adjustment of the clamp 35 with respect to the support 28. A mechanism permitting vertical adjustments to within one ten millionth of an inch constitutes the subject matter of our copending application Serial No. 289,808 to which reference may be had.

The relatively simple mechanism shown in the drawings comprises a clamp 35 which is attached to the end 36 of the resilient arm 37, the other end 38 of which is fixed to the projection 39 on the support 28. The resiliency of the arm 37 forces its end 36 against the end 40 of the screw 41 which moves threadably thru the support 28. Vertical adjustment of the clamp 35 with respect to the support 28 can therefore be accomplished by turning the screw 41, and the position of the clamp 35 can be determined from the divided circle 42 fixed on the screw 41 and from the pointer 43 fixed on the support 28.

The point 15 is in a vertical plane with the points 12 and 12', and the point 14 is in approximately a horizontal plane with the points 12 and 12'.

The position of the arm 11 is determined by observing the position of the cross hair 44 on the frame 50 which is fixed to the arm 11, the observation being made by means of the microscope objective 47, the prism 48, and the micrometer eyepiece 49 all of which are fixed to the support 28. The cross-hair is illuminated by a beam of light entering thru the hole 45 in the support 28.

The preferred method of making observations to determine changes in gravitational force as the instrument is moved from point to point is as follows: The screw 41 is adjusted to bring the arm 11 to a predetermined position. The amount of turning of the screw necessary to do this is a measure of the change in gravitational force from that at the station previously observed.

Screws 51 threaded thru the support 28, or projections on it, limit the motion of the arm 11. In Fig. 7 the following device is provided for clamping the arm 11 while the instrument is being transported. Rods 52 passing thru openings 53 in the support 28 are attached to leaf springs 55, which are fixed at 54 to projections 56 on the support 28. The leaf springs 55 tend to force the rods 52 downwardly but are prevented from doing so by the enlarged portions 58 of the screws 57, which are threaded thru the support 28. When the screws 57 are screwed downwardly, the leaf springs 55 are allowed to force the rods 52 against the ends of the arm 11, holding it against the lower stop screws 51 with a force which is entirely dependent upon the stiffness of the springs 55.

Let us now consider mathematically the instrument just described. In order to do this it will be temporarily assumed that the arm 11 is pivoted on the line 12—12' with respect to the support 28. Such a pivot is not shown in the figures, and it will later be shown that this pivot can be removed without influencing the sensitivity of the instrument. However, temporarily assuming a pivot on the line 12—12', it may be shown that the instrument is a special case of the device previously described in connection with Fig. 6 having in addition the springs 33 and 33'. These springs, however, act thru the axis 12—12', and therefore produce no torque on the arm 11 about this axis. The instrument of Fig. 7 therefore has theoretically infinite sensitivity.

It will now be shown that the sum of the forces acting on the pivot is zero for all positions of the arm 11. Since the point of attachment 14 of the spring 13 is at the center of gravity of the arm 11, the force exerted by the spring on the pivot and that exerted by the weight on the pivot are in the same direction, and therefore according to Equations 33 and 34 their combined effect is $$F_0 = kb - ka \cos\theta + W \cos\phi \quad (35)$$

using the symbols previously defined in connection with Fig. 6. Also for the instrument shown in Fig. 7 we have, according to Equation 12, $$kab - Wc = 0 \quad (12')$$

and also $$b = 0 \text{ and } \phi = \theta$$

Therefore Equation 35 becomes $$F_0 = kb \quad (36)$$

and $F_0$ is therefore a constant. We can therefore exactly balance $F_0$ for all positions of the arm 11 by connecting springs 33 and 33' to the proper points 32 and 32' on the arm and by properly stretching them. The force exerted on the pivot is therefore zero for all positions of the arm 11, hence the pivot can be removed without influencing the sensitivity of the instrument.

The conditions just imposed on the springs 33 and 33', namely of connecting them to the proper points 32 and 32' and of properly stretching them, are both automatically satisfied if there is no pivot and therefore need not be considered in the actual construction of the instrument. The removal of the pivot is advantageous because it permits the arm 11 to move in any direction when the instrument is subjected to jars.

Attention is now directed to potential sources of error and the manner of reducing error from such sources in accordance with the invention. An important source of error is hysteresis in springs and bent wires. Springs are said to have hysteresis because their behavior depends not only on the forces applied to them but also on how much they have been stretched previously. Let us consider for example a spring which has been unloaded for a considerable time. If a weight is hung on such spring, it will stretch a certain amount almost instantly. However, if the weight is continuously suspended the spring will continue to stretch, usually very slowly. Ordinarily this rate of stretch will gradually decrease with time. If after an interval the weight is removed, it will be found that the spring does not return to its original length. Instead the spring will be slightly longer, but the difference in length will gradually decrease with time.

Hysteresis similar to that just described will also occur in wires which are bent as for example the wires which attach the springs 13 and 33 to the clamps 35, 59, 60 and 61. As the arm 11 moves these wires will be bent near the clamps. This bending results in hysteresis, which causes errors in measurements.

Errors due to elastic hysteresis just outlined can be reduced to any desired amount by suitably limiting the amount of motion of the arm 11 in Fig. 7. This limitation of the motion is accomplished in the instrument shown in Fig. 7 by the stops generally referred to as 51. The amount of motion that is permissible depends upon the accuracy desired, the dimensions, materials, and the general design of the instrument. For the instrument described a few hundredths of an inch of motion provides an accuracy of two parts in one hundred million. This information of course is given by way of illustration and not by way of limitation. If the springs 13, 33, and 33' are heavy, it is sometimes desirable to use stops to limit their motions.

While the instrument is being transported, it is desirable to further restrict the motion of the arm 11. This can be done by clamping the arm during transportation. A method of clamping has already been described in connection with Fig. 7. It is also possible to use stops or a clamp only during transportation, the motion of the arm being controlled while taking readings by suitably manipulating the screw 41.

The use of the instrument when readings are taken by the deflection method rather than by the null method will now be considered. With a given instrument and a given required accuracy there will be, because of hysteresis, a corresponding allowable motion of the arm 11. The range that the instrument can cover will therefore depend upon its sensitivity, such range being inversely proportional to the sensitivity. If the sensitivity is decided upon, the range will be fixed. If this range is sufficiently large, readings can be taken by the deflection method. It should be mentioned in this connection that the constant sensitivity of the instrument is an important advantage when readings are taken by the deflection method.

However, for a given accuracy and sensitivity, it often happens that a sufficient range can not be obtained when readings are taken by the deflection method. In these cases the null method or a combination of the null and deflection methods must be used; that is, the arm 11 in Fig. 7 can either be brought to a reference position or it can be brought near the reference position and a correction can be made for the distance the arm is from such reference position. The latter method is preferable when it is important to take readings rapidly. It is preferable, though not necessary, that instruments constructed in accordance with the invention shall be equipped with micrometer eyepieces so that either method may be used.

Obviously there are numerous methods of bringing the arm 11 to or near a reference position. As has already been mentioned this is done in the preferred form of the invention by adjusting the point of attachment 15 of the zero-length spring to the support 28. This method requires a device capable of very accurate adjustment but minimizes errors due to hysteresis because it does not require large changes in the length of the spring 13. Another method of adjusting the position of the arm 11 is as follows: A small part of the weight of the arm 11 is supported by a weak spring, and suitable adjustments of the point of attachment of the weak spring to the support are made to bring the arm 11 to the desired position as illustrated in our copending application Serial No. 262,114 to which reference has been made. The adjustment of the point of attachment of the weak spring to the support requires much less accuracy than the corresponding adjustment required in the preferred method, but the weak spring method gives considerable errors due to hysteresis. It might be mentioned that the addition of a weak spring to the instrument will not appreciably affect the sensitivity of the instrument if the effect of the weak spring is allowed for by the method given in connection with Equation 30. It is obvious that other methods of adjusting the position of the arm 11, as for example electric or magnetic forces, may be utilized and it is intended that this invention shall include such equivalent means for adjusting the amount or direction of any force or forces exerted on the moving system in order to bring the moving system near a predetermined position relative to the other elements of the instrument.

Attention is now directed more specifically to the connections between the arm 11 and the support 28 in the embodiment of the invention shown in Fig. 7. In order to show the utility of the springs 33 and 33' consideration is had of the errors that will result if these springs are replaced by flexible but practically inextensible wires. As the arm 11 moves between stops these wires will be bent and nearly all of this bending will take place very near the points at which they are clamped. The space in which the bending takes place will become still shorter and the bending will become more abrupt if the tension in the wires is increased. Since the tension can be increased enormously by jarring the support of the instrument, it is obvious that large errors due to hysteresis can be produced in that way. However such increases in tension can be almost completely eliminated by using the springs 33 and 33' as best shown in Fig. 8. The use of these springs and the spring 13 gives a connection between the arm 11 and the support 28 which we will call yieldable under impact. Such connections give an enormous increase in accuracy in a portable instrument.

Figure 10:
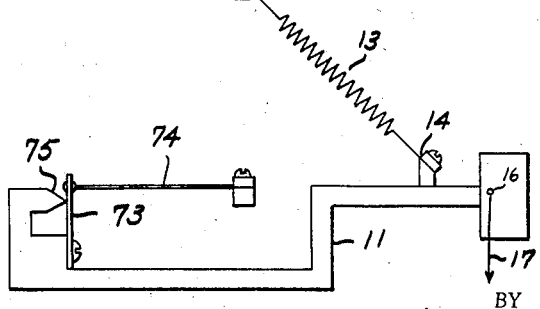
Fig. 10 is a diagrammatic view of an alternative construction which provides for desired yielding under impact.

Another type of connection which is yieldable under impact is shown in elevation in Fig. 10. The instrument shown there is similar to that shown in Figs. 7, 8 and 9. Corresponding parts are identified by like reference characters. In Fig. 10 the arm 11 is connected to the support thru the leaf springs 73 and the flexible and practically inextensible wires 74. The leaf springs 73 are concave to the left when unstressed but they are held straight by the stops 75, which are rigidly fixed to the arm 11. The tension in the leaf springs 73 is such that in ordinary operation of the instrument they are pressed against the stops 75 but will be resiliently withdrawn therefrom by the wires 74 when the instrument is subjected to appreciable jars. This type of connection also is yieldable under impact but gives the instrument greater stability while readings are being taken than the connection previously considered.

Figure 11:
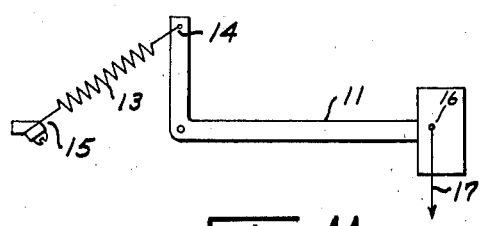
Figure 12:
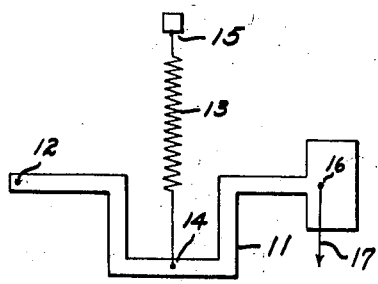
Figure 13:
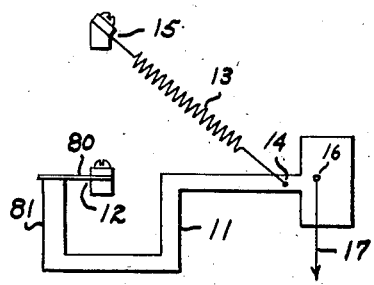

As already indicated the invention is shown in one of its simplest forms in Fig. 6. Obvious modifications can be obtained by connecting the spring 13 in Fig. 6 to various points on the arm 11 and also moving the point 15 so as to fulfill the conditions given in the discussion of Fig. 6. Two modifications of this type are shown in Figs. 11 and 12. The description previously given of Fig. 6 applies equally well to Figs. 11 and 12. It should be mentioned in connection with Fig. 12 that if the effective point of application 16 of the force to be measured is on a line between the points 14 and 15, then the force on the pivot 12 is zero. This condition holds for only a certain position of the arm 11, but the force on the pivot is small for positions near this position. A delicate pivot can therefore be used.

It is possible to use a bearing or knife edge to form a pivot but the solid friction involved is generally objectionable. A common method of obtaining an axis of rotation is the following modified form of the method shown in Figs. 7, 8 and 9. The springs 33 and 33' are replaced by short flexible but inextensible connectors 80 as shown in elevation in Fig. 13. This method gives an axis of rotation that is relatively fixed even when the effective point of application 16 of the force to be measured is not at the point 14. The use of short connectors 80 gives rise however, to a difficulty which will become apparent from the following considerations. If a given accuracy is required, the angle thru which the connectors 80 move must be limited because of hysteresis in the connectors. This limitation is best accomplished by locating stops around the left end 81 of the arm 11. For a given angle of motion of the connectors 80 the distance of these stops from the end 81 of the arm will be proportional to the length of the connectors. Short connectors will therefore require close stops and such stops can easily get out of adjustment because of temperature variations or jars. Long connectors such as are shown in Figs. 7 and 8 are therefore preferable.

Other modifications of the method of suspending the arm 11, shown in Figs. 7, 8 and 9 are of interest. Let us consider first this suspension when the effective point of application of the force to be measured is not at the point 14. As the force varies, the arm 11 rotates about an axis but this axis moves somewhat as the arm rotates. However in spite of this motion of the axis it is generally possible to obtain a high and constant sensitivity by following the method outlined in the discussion of Equation 30.

Figure 14:
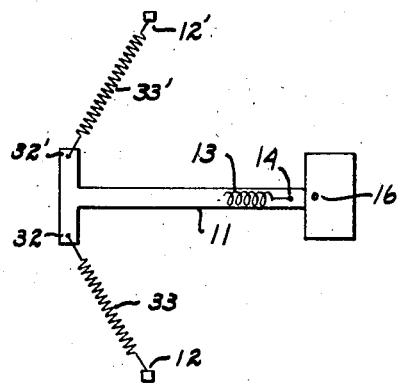

Another modification is obtained by greatly increasing the distance between 12 and 12' of Fig. 8 in the manner shown in Fig. 14, which is a top view of the modified instrument. This modification reduces the bending at the ends of the springs 33 and 33' as the arm 11 rotates. The bending is replaced by twisting in the springs 33 and 33' which often gives smaller errors from hysteresis.

Figure 15:
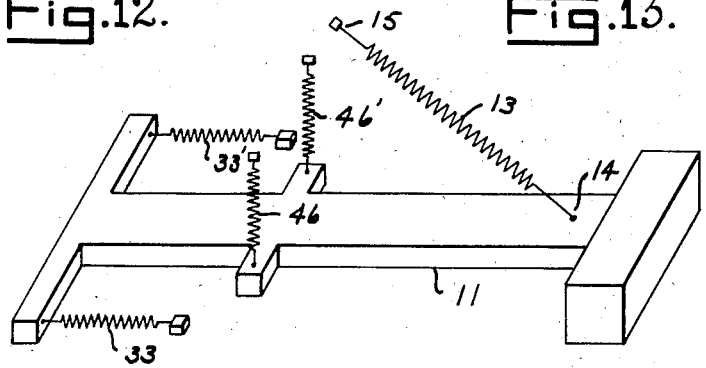

Another modification of the suspension shown in Figs. 7 and 8 which also permits the elimination of a pivot without affecting the infinite sensitivity for all positions of the arm 11 will now be described. Again it will be assumed that the arm 11 in Figs. 7 and 8 is pivoted on the line 12—12' to the support 28. It is also assumed that the effective point of application of the force to be measured is not at the point 14 but is at some other point in a plane thru the point 14 and the axis 12—12'. According to the discussion of the sensitivity given in connection with Fig. 6, this change will not affect the sensitivity of the instrument as the angle $\phi$ still equal the angle $\theta$. The force to be measured may be replaced by two forces parallel to it which, added vectorially, give the force to be measured and which give the same torque about the axis 12—12' as the force to be measured. Referring to Fig. 15 we will take one of these forces at the point 14 and the other at the axis 12—12' and balance the latter by attaching a pair of vertical springs 46, 46' to the arm 11 at points which lie on such axis. The reaction on the temporarily assumed pivot at 12—12' due to the first of these forces can be balanced for all positions of the arm 11 by the springs 33 and 33' as previously explained in the discussion of Fig. 7. The reaction of the second force on the assumed pivot at 12—12' is balanced by the springs 46, 46'. The force on the pivot is therefore zero for all positions of the arm and hence the pivot can be removed without affecting the sensitivity of the instrument.

Figure 16:
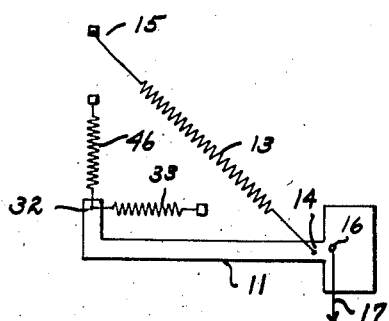

We have already described, one of the many methods of obtaining a high and constant sensitivity even when the arm is suspended in such a way that it rotates about an axis which moves upon variation in the force to be measured. The suspension shown in Fig. 16 is another example of this type. This suspension is the same as that shown in Fig. 15 except that the springs 33 and 33' and their clamps have been moved to the right of a vertical plane through the point 15. The points of attachment of the springs 33 and 46 to the arm 11 all lie on a line through the point 32 and perpendicular to the plane of the figure. It can be seen that if the force to be measured varies, the arm 11 will rotate about an axis which may move as the arm rotates but which will be near the line through the point 32. It is possible to obtain a high and constant sensitivity with an instrument of this type by following the method previously given in the discussion of Equation 30.

Figure 17:
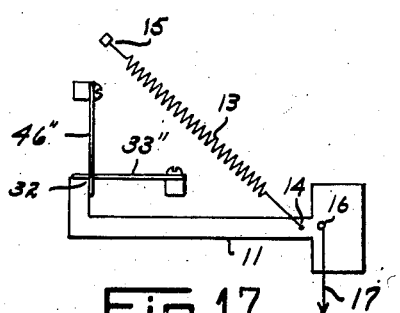

A modification of the suspension shown in Fig. 16 is that shown in Fig. 17 and which is obtained by replacing the paired springs 33 and 46 by flexible but practically inextensible paired connections 33'' and 46''. This places the axis of rotation of the arm 11 practically on a line through the point 32.

Figure 18:
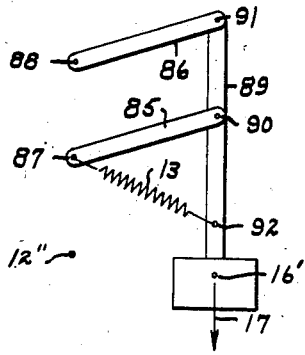

Another modified form of the invention is shown in elevation in Fig. 18. The arms 85 and 86 are pivoted to the support at 87 and 88 respectively. The vertical arm 89 is pivoted to the arms 85 and 86 at 90 and 91 respectively, the distance from 90 to 91 being equal to that between 87 and 88. The arm 89 is adapted to be acted upon by the force to be measured, which we will assume acts in the direction of the arrow 17. The pivots 87 and 88 are so placed that a line parallel to the arrow 17 can be drawn thru such pivots. The zero-length spring 13 has its ends connected to the support on the pivot line 87 and to the arm 89 at 92. The relationship between this form of the invention and that of Fig. 6 will now be shown. It can be seen that as the arm 89 moves it undergoes a translation and the point 92 rotates about a line through the point 12'' directly below the point 87 a distance equal to that between the points 90 and 92. The motions of the spring 13 and the center of gravity 16' of the arm 89 are therefore the same as the motions of the spring 13 and the center of gravity 16 of the arm 11 in Fig. 6. The embodiment shown in Fig. 18 therefore has theoretically infinite sensitivity as do the previously described embodiments.

Figure 19:
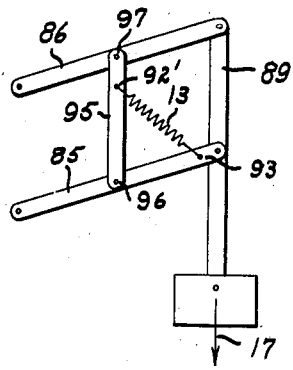

The form of our invention just described may be further modified as shown in elevation in Fig. 19. This embodiment retains the arms 85, 86 and 89 of the structure shown in Fig. 18. In addition, however, a link 95 is pivotally attached to each of the arms 85 and 86 at points 96 and 97 equidistant from the pivot points 87 and 88 respectively. The figure also shows that the zero-length spring 13 has been moved to a new position. It is shown attached to the link 95 and the arm 85 at the points 92' and 93 respectively. The following considerations show that it is possible to move the spring 13 to the new position without influencing the sensitivity. The points of connection 92' and 93 of the zero-length spring 13 subtend the same dihedral angle about the pivot 96 in Fig. 19 that its points of connection 87 and 92 subtend about the pivot 90 in Fig. 18. According to Equation 8 the torque produced by the zero-length spring 13 in either case varies with the angle in the same manner. Therefore either way of connecting the spring can be made to give infinite sensitivity over the entire range of the instrument.

The preceding disclosure has considered only forms of the invention in which a single zero-length spring is used. Consideration is now had of some alternative constructions in which more than one zero-length spring is used.

In the embodiment shown in Fig. 20 the moving system which is generally referred to as 100 is pivoted at 101 and comprises arms 102, 103, 104 and 105 rigidly connected together. There may be any number of such arms, four only being shown in the figure for simplicity. The arms may have any desired lengths and the configuration they form is entirely arbitrary. The zero-length springs 106, 107 and 108 are attached to these arms at the points 109, 110 and 111 and attached to the support at the points 112, 113 and 114 respectively. The effective point of application of the force to be measured is at the point 16 on the arm 102 and the direction of the force is shown by the arrow 17. We will assume that this force is constant in magnitude and direction over the range of motion of the moving system 100.

We will let $A$=the angle between the pivot line 101 and the direction 17 of the force to be measured, $a'$, $a''$, $a'''$=the distances from the pivot line 101 to the points 112, 113 and 114 respectively, $b'$, $b''$, $b'''$=the distances from the pivot line 101 to the points 109, 110 and 111 respectively, $c$=the distance from the pivot line 101 to the point 16, $\theta'$, $\theta''$, $\theta'''$=the dihedral angles having their vertices at the pivot line 101 and having their planes pass thru the points 109 and 112, 110 and 113, and 111 and 114 respectively, $\phi$=the dihedral angle having its vertex on the pivot line 101, one plane passing thru the point 16 and the other plane extending from 101 in the direction opposite to the direction 17, $k'$, $k''$, $k'''$=the spring constants of the springs 106, 107 and 108 respectively, $W$=the magnitude of the force to be measured. Then according to Equations 2 and 8 the total torque about the pivot line 101 is $$T_o = k'a'b' \sin \theta' + k''a''b'' \sin \theta'' + k'''a'''b''' \sin \theta''' - Wc \sin A \sin \phi \quad (37)$$

It should be noted that as the moving system 100 rotates about 101 the angles $\theta'$, $\theta''$, $\theta'''$, and $\phi$ differ from each other by constant angles. Or, in other words $$\theta'' = \theta' + B''$$
$$\theta''' = \theta' + B'''$$

when $B''$ and $B'''$ are constants. Equation 37 then becomes $$T_o = (k'a'b' + k''a''b'' \cos B'' + k'''a'''b''' \cos B''') \sin \theta' + (k''a''b'' \sin B'' + k'''a'''b''' \sin B''') \cos \theta' - Wc \sin A \sin \phi \quad (38)$$

The expressions in the first two parentheses remain constant as the moving system is moved. We will therefore designate them as $K \cos B$ and $K \sin B$. This can always be done by properly choosing the constants $K$ and $B$. Equation 38 then becomes $$T_o = K \cos B \sin \theta' + K \sin B \cos \theta' - Wc \sin A \sin \phi \quad (39)$$
$$= K \sin (\theta' + B) - Wc \sin A \sin \phi \quad (40)$$

Let us now change the direction 17 of the force to be measured. In the case of a gravity meter this can be done by rotating the whole instrument, support and moving system, about the line 101. A direction of the force can always be found such that $\phi = \theta' + B$ for all positions of the moving system. We will then have $$T_o = (K - Wc \sin A) \sin \phi \quad (41)$$

The quantity in the parentheses in Equation 41 can always be made zero in many ways; for instance it can be done by properly choosing $c$. If the expression is made zero, we have, $T_o = 0$ for all values of $\phi$ and we have an infinite sensitivity for the entire range of the instrument. It should be noted that there are very few restrictions on this form of the invention. The moving system may have any configuration and may have any number of zero-length springs attached to arbitrary points thereon and to arbitrary points on the support. Although the mathematical proof required that the force to be measured be constant in magnitude and direction over the range of the instrument, a high and constant sensitivity can ordinarily be attained even if this condition is not satisfied by following the method outlined in the discussion of Equation 30. Methods of eliminating the pivotal connection between the moving system and support have already been given, but one additional method will be described now.

One method of eliminating the pivot is shown in elevation in Fig. 21. It is first assumed that the moving system 120 is pivoted to the support at 121 and it will then be shown that the pivot can be removed without affecting the sensitivity. The moving system 120 consists of the two arms 122 and 123 rigidly connected together. The effective point of application of the force to be measured is at the point 16 on the arm 120. Two zero-length springs 13 and 13' are connected to the arms 122 and 123 at the points 14 and 14' respectively, these points lying in a plane containing the pivot line 121 and the point 16. The zero-length springs 13 and 13' are connected to the support at points 15 and 15' which lie in a plane parallel to the line 17, which plane passes thru the pivot line 121. The point 15' is below the line 121 if the point 16 is to the right of the point 14 and vice versa. The force 17 may be replaced by two separate forces which are parallel to the direction of the force 17 and which give the same torque about the pivot line 121 and the same resultant force on the moving system 120 as does the original force 17. Let us replace the force 17 by two such forces 17' and 17'' which act through the points 14 and 14' respectively. The force 17'' will be directed upwards if the point 16 is to the right of the point 14 and vice versa. We will later find it desirable to suitably adjust the force 17'' leaving the force 17' constant in order to balance the instrument. This is equivalent to suitably varying the magnitude of the original force 17 and suitably increasing or decreasing the distance from the pivot 121 to a point 16. In the case of a gravity meter this can be done by properly varying and shifting weights on the moving system 120.

The instrument just described actually consists of two instruments of the type shown in Fig. 6 rigidly connected together, the first of which consists of the arm 122, the spring 13, and the force 17', and the second of which consists of the arm 123, the spring 13', and the force 17''. We will assume that the constant of the spring 13 is such as to balance the force 17'. We will also assume that when the arm 123 is perpendicular to the line of force 17″, the constant of the spring 13′ is such as to exert a force on the pivot just equal to that exerted on it by the spring 13. We will then assume that the force 17″ is adjusted to balance the spring 13′.

Since each of the two instruments making up the composite instrument shown in Fig. 21 satisfy the conditions for infinite sensitivity, the force exerted by each on the pivot will remain constant as the moving system 120 moves, and since these forces balance each other when the arm 123 is perpendicular to 17″, they will balance at all positions. The force on the pivot will therefore be zero for all positions of the moving system 120 and the pivot can be removed without affecting the sensitivity of the instrument.

Up to now we have considered forms of the invention in which a high and constant sensitivity was attained by using at least one zero-length spring. Let us now consider some ways in which zero-length springs can be replaced by springs having positive and negative unstressed lengths. It has already been mentioned that a zero-length spring can be made out of a negative length spring by adding the proper amount of straight wire or other practically inextensible material to it. It is also possible to make a zero-length spring by connecting several springs in series such as springs 125, 126 and 127 as shown in Fig. 22 if the sum of the unstressed lengths of the springs is zero.

It seems obvious that the springs 125, 126 and 127 of Fig. 22 may comprise separate portions of a single spring in which the respective portions have different unstressed lengths.

In order to show other methods of replacing zero-length springs let us consider further the device in Fig. 20 already described. Let us however assume that the springs 106, 107 and 108 have unstressed lengths $L'$, $L''$ and $L'''$ respectively, instead of being necessarily of zero-length. Let us consider under what conditions the torque exerted about the pivot 101 by the spring 106 is equal to the sum of the torques exerted about this pivot by the springs 107 and 108. We will use the symbols already defined in connection with Fig. 20, and in addition let $f'$, $f''$, $f'''$ = the distances from the points 112, 113, 114 to planes perpendicular to the pivot line 101 and passing thru the points 109, 110, and 111 respectively, $g'$, $g''$, $g'''$ = the lengths of the springs 106, 107, 108 respectively. Let us assume for the moment that $L'=0$. Then according to Equation 8 the torque exerted about the line 101 by the spring 106 will be $$T'_s = k'a'b' \sin \theta'$$

However if the initial length of the spring 106 is not zero but some amount $L'$ instead, then the force it exerts and, therefore $$T'_s$$

will be reduced in the ratio $$\frac{g'-L'}{g'}$$

We will therefore have $$T'_s = k'a'b'\left(1-\frac{L'}{g'}\right)\sin\theta' \quad (43)$$

An explicit expression for $g'$ is $$g' = \sqrt{(a')^2+(b')^2-2a'b'\cos\theta'+(f')^2} \quad (44)$$

The expressions for $g''$ and $g'''$ and for the torques exerted by the springs 107 and 108 are of course the same as those given in Equations 44 and 43 except for the superscripts. We thus see that the spring 106 can be replaced by the springs 107 and 108 if $$\theta' = \theta'' = \theta''' \quad (45)$$

$$k' = k'' + k''' \quad (46)$$

$$\frac{k'a'b'L'}{g'} = \frac{k''a''b''L''}{g''} + \frac{k'''a'''b'''L'''}{g'''} \quad (47)$$

A possible way of satisfying Equation 47 is as follows: Let $R''$ and $R'''$ be any positive constants; then choose $a''$, $a'''$, $b''$, $b'''$, $f''$, $f'''$, $L''$, and $L'''$ such that $$a' = R'' \, a'' = R''' \, a''' \quad (48)$$

$$b' = R'' \, b'' = R''' \, b''' \quad (49)$$

$$f' = R'' \, f'' = R''' \, f''' \quad (50)$$

$$k'L' = \frac{k''L''}{R''} + \frac{k'''L'''}{R'''} \quad (51)$$

Other solutions can be obtained by interchanging $a''$ and $b''$ or $a'''$ and $b'''$ or both in Equations 48 and 49.

The preceding disclosure gives conditions under which any spring, whether zero-length or not, may be replaced by two other springs. Obviously either or both of the new springs may be replaced by two others and so on as many times as desired. However attention is directed to one very important point. All the quantities in Equation 47 except $L'$, $L''$, and $L'''$ are essentially positive; therefore if $L'$ is zero or negative, either $L''$ or $L'''$ must be zero or negative. This shows that, if a zero or negative length spring is replaced by two springs, one of them must be zero or negative in order to fulfill the exact mathematical conditions of the invention. It also shows that, if successive spring replacements are made, at least one of the springs finally used in the instrument must be zero or negative in order to attain theoretically infinite sensitivity over the entire range of the instrument. However it has been pointed out in the discussion of Equation 30 that a high and fairly constant sensitivity can be attained even without using a zero or negative length spring even if one of small unstressed length is used and suitable adjustments are made. The high and constant sensitivity in this case results from approximating the mathematical conditions for theoretically infinite sensitivity. It can therefore be stated that the invention comprehends the use of a zero-length spring, a negative length spring, or a positive length spring of small unstressed length.

Broadly the invention comprehends the provision of a measuring instrument which attains a high, or constant sensitivity, or both by the use of at least one spring whose unstressed length is small algebraically compared to its elongation in actual use.

What is claimed is:

1. A measuring device comprising a member adapted to respond to the force to be measured, a spring attached to said member and exerting a component of force overcoming the force to be measured and a second component of force at right angles thereto, an abutment on said member, a stressed leaf spring secured to said member and in engagement with said abutment, and inextensible means attached to said spring to overcome said second component of force, said leaf spring being operable as a resilient connection for the member when subjected to impact.

2. A measuring device of the class described comprising, a support, an elongated member adapted to respond to the force to be measured and connected to said support to swing about a line as an axis upon variations in said force, said member having a portion offset from a plane passing through the axis and the center of gravity of the member, and a zero-length spring attached to said offset portion and to said support and extending substantially normal to said plane to hold the member in a position of equilibrium.

3. A measuring device of the class described comprising, a support, an elongated member adapted to respond to the force to be measured, a zero-length spring attached to the support and to the member at a point spaced from the center of gravity of the member and exerting solely in tension a component of force partially balancing the force to be measured and a second component of force at an angle thereto, resilient means attached to the support and member applying a force solely in tension to overcome said second component of force, whereby the member tends to swing about a line as an axis, and additional resilient means acting through said axis applying a force solely in tension to balance the remainder of the force to be measured.

4. A gravity measuring apparatus comprising a frame, a gravity responsive member having a laterally extending lever portion, a plurality of spring means stressed substantially solely in tension connected to the frame and to said lever portion, said spring means being so disposed that their effect acts in the path of movement of the weight member so as to normally floatingly suspend said gravity responsive member with the lever portion disposed in a generally horizontal plane, and means for determining the displacement of said member, at least one of said springs comprising a substantially zero length spring.

5. A gravity measuring apparatus comprising a frame, a gravity responsive member having a laterally extending lever portion, a plurality of spring means stressed substantially solely in tension connected to the frame and to said member, said spring means being so disposed that their effect acts in the path of movement of the weight member so as to normally floatingly suspend said gravity responsive member with the lever portion disposed in a generally horizontal plane, and means for determining the displacement of said member, at least one of said springs comprising a negative length spring.

6. A gravity measuring apparatus comprising a frame, a gravity responsive member having a laterally extending lever portion, a plurality of spring means stressed substantially solely in tension connected to the frame and to said member, said spring means being so disposed that their effect acts in the path of movement of the weight member so as to normally floatingly suspend said gravity responsive member with the lever portion disposed in a generally horizontal plane, and means for determining the displacement of said member, at least one of said springs being substantially a zero-length spring.

7. A gravity measuring apparatus comprising a frame, a gravity responsive member having a laterally extending lever portion, a plurality of spring means stressed substantially solely in tension connected to the frame and said lever portion, said spring means being so disposed that their effect acts in the path of movement of the weight member so as to normally floatingly suspend said gravity responsive member with the center of gravity of the member in substantially the horizontal plane incorporating the center of rotation of the lever portion, and means for determining the displacement of said element, at least one of said springs being a substantially zero length spring.

8. A device of the class described comprising a frame, a force responsive member having a laterally extending lever portion, a plurality of spring means stressed substantially solely in tension connected to the frame and to said member, said spring means being so disposed that their effect acts in the path of movement of the weight member so as to normally floatingly suspend said force responsive member with the lever portion disposed in a generally horizontal plane, and means for determining the displacement of said element, at least one of said spring means comprising a negative length spring attached to the support and member, at least one end of the spring being attached through an inextensible connector so that the spring and connector function as a substantially zero-length spring.

9. A gravity measuring device comprising the combination of, a support, an elongated weight member adapted to respond to the force to be measured, and a plurality of approximately purely tension spring means floatingly suspending said member from said support to pivot about a point in response to the force of gravity, said spring means being disposed so that their effect acts in the path of movement of said weight member and the weight member is yieldable in any direction under impact, said spring means including at least one spring of substantially zero length, and means for restoring the member to normal position for effecting a null reading.

10. A gravity measuring device comprising the combination of, a support, an elongated weight member adapted to respond to the force to be measured, and a plurality of approximately purely tension spring means floatingly suspending said member from said support to pivot about a point in response to the force of gravity, said spring means being disposed so that their effect acts in the path of movement of said weight member and the weight member is yieldable in any direction under impact, said spring means including at least one spring of negative length, and means for restoring the member to normal position for effecting a null reading.

11. A gravity measuring device comprising the combination of, a support, an elongated weight member adapted to respond to the force to be measured, and means for suspending said weight member including a plurality of approximately purely tension spring means floatingly suspending said member from said support to pivot about a point in response to the force of gravity, said spring means being disposed so that their effect acts in the path of movement of said weight member and the weight member is yieldable in any direction under impact, said spring means including at least one spring of substantially zero length, and means for restoring the member to normal position for effecting a null reading.

12. A gravity measuring device comprising the combination of, a support, an elongated weight member adapted to respond to the force to be measured, and means for suspending said weight member including a plurality of approximately purely tension spring means floatingly suspending said member from said support to pivot about a point in response to the force of gravity, said spring means being disposed so that their effect acts in the path of movement of said weight member and the weight member is yieldable in any direction under impact, said spring means including at least one spring of negative length, and means for restoring the member to normal position for effecting a null reading.

13. A gravity measuring device comprising the combination of, a support, a weight member adapted to respond to the force to be measured, and means for suspending said weight member including a plurality of approximately purely tension spring means attached to the weight member at spaced points and floatingly suspending said member from said support to pivot about a point in response to the force of gravity, said spring means being disposed so that their effect acts substantially in the path of movement of said weight member and the weight member is yieldable in any direction under impact, said spring means including at least one spring of substantially zero length, and means for restoring the member to a selected position for effecting a reading.

14. A gravity measuring device comprising the combination of, a support, a weight member adapted to respond to the force to be measured, and means for suspending said weight member including a plurality of approximately purely tension spring means attached to the weight member at spaced points and floatingly suspending said member from said support to pivot about a point in response to the force of gravity, said spring means being disposed so that their effect acts substantially in the path of movement of said weight member and the weight member is yieldable in any direction under impact, said spring means including at least one spring of negative length, and means for restoring the member to a selected position for effecting a reading.

15. A gravity measuring device comprising the combination of, a support, an elongated weight member adapted to respond to the force to be measured, and a plurality of tension spring means floatingly suspending said member from said support to pivot about a point in response to the force of gravity, said spring means being in general parallelism with the path of movement of said weight member, the weight member being yieldable in any direction under impact, said spring means including at least one spring of substantially zero length, and means for restoring the member to normal position for effecting a null reading.

16. A gravity measuring device comprising the combination of, a support, an elongated weight member adapted to respond to the force to be measured, and a plurality of tension spring means floatingly suspending said member from said support to pivot about a point in response to the force of gravity, said spring means being in general parallelism with the path of movement of said weight member, the weight member being yieldable in any direction under impact, said spring means including at least one spring of negative length, and means for restoring the member to normal position for effecting a null reading.

17. A gravity measuring device comprising the combination of a support, an elongated weight member adapted to respond to the force to be measured, and a plurality of approximately purely tension spring means floatingly suspending said member from said support to pivot about a point in response to the force of gravity, said spring means being disposed so that their effect acts in the path of movement of said weight member and the weight member is yieldable in any direction under impact, said spring means including at least one spring of substantially zero length, and means for restoring the member to normal position for effecting a null reading, the center of gravity of said weight member being approximately in a horizontal plane with said pivot point.

18. In a device for measuring variations in gravitational attraction the combination of, a weight member, means suspending the weight member including means for exerting a diagonally upward force through the center of gravity of said member, and means for applying a resilient horizontal force to the weight member to maintain the member in equilibrium.

19. In a device for measuring variations in gravitational attraction the combination of, a weight member, means suspending the weight member including means for exerting a diagonally upward force through the center of gravity of said member, means for applying a resilient horizontal force to the weight member to maintain the member in equilibrium and means for varying the vertical component of force through the center of gravity of the weight member so that the displacement of said member may be maintained between predetermined limits.

20. In a device of the class described the combination of, a fixed member, an elongated weight member, a suspension extending diagonally upwardly from the weight member to the fixed member to exert a vertical component of force to support the weight member, and resilient means attached to the weight member in spaced relation with the point of attachment of the suspension thereto for neutralizing the horizontal component of force exerted by the suspension.

21. In a device of the class described the combination of, a fixed member, a weight member, a suspension extending diagonally upwardly from the weight member to the fixed member and attached to the weight member at the center of gravity thereof to exert a vertical component of force to support the weight member, and means for resiliently exerting a horizontal component of force to maintain the weight member in equilibrium.

22. A force measuring device of the character described comprising, a support, a weight member, means suspending the weight member including means connected to the center of gravity of said weight member and to said support to resiliently support the weight member whereby the weight member may be influenced by the force to be measured, said support means exerting a force having vertical and horizontal components, and resilient means for neutralizing the horizontal component of force exerted by the support means.

23. A force measuring device of the character described comprising, a support, an elongated weight member, means comprising a zero-length spring suspending the weight member and connected to said support to resiliently support the former whereby such weight member may be influenced by the force to be measured, said support means exerting a force having vertical and horizontal components, and resilient means for neutralizing the horizontal component of force exerted by the zero-length spring.

24. A measuring instrument of the class described comprising, a mass, means suspending the mass including a support, a zero length spring having its ends connected to the support and mass and exerting an upwardly inclined force through the center of gravity of the mass, means for applying a resilient horizontal force to the mass to counterbalance the horizontal component of force exerted by said spring, and means for moving said support a determinable amount to bring the mass to a predetermined position.

25. A measuring instrument of the class described comprising, a mass, means suspending the mass including a support, a spring having its ends connected to the support and mass and exerting an upwardly inclined force through the center of gravity of the mass, means for applying a resilient horizontal force to the mass to counterbalance the horizontal component of force exerted by said spring, means for moving said support to bring the mass to a predetermined position, and means for measuring the displacement of the support to move the mass to such position.

26. A measuring instrument of the class described comprising, a mass, means suspending the mass including a support, resilient means connected to the support and mass for exerting an upwardly inclined force through the center of gravity of the mass, means for applying a resilient horizontal force to the mass whereby the mass is maintained in equilibrium, and means for moving said support a determinable amount to bring the mass to a predetermined position.

LUCIEN J. B. LA COSTE.
ARNOLD ROMBERG.